(12) United States Patent
Kwon et al.

(10) Patent No.: US 7,639,292 B2
(45) Date of Patent: Dec. 29, 2009

(54) APPARATUS AND METHOD FOR IMPROVING IMAGE QUALITY IN IMAGE SENSOR

(75) Inventors: Seong-Geun Kwon, Daegu (KR); Kuhn-Il Lee, Daegu (KR); Kyu-Ik Sohng, Daegu (KR); Chan-Ho Han, Daegu (KR); Soo-Wook Jang, Daegu (KR); Eun-Su Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 11/159,223

(22) Filed: Jun. 23, 2005

(65) Prior Publication Data

US 2005/0285952 A1    Dec. 29, 2005

(30) Foreign Application Priority Data

Jun. 29, 2004  (KR) .................. 10-2004-0049656

(51) Int. Cl.
    *H04N 9/64*  (2006.01)
(52) U.S. Cl. .................. 348/243; 348/222.1; 348/234; 348/256; 382/167
(58) Field of Classification Search .................. 348/243
    See application file for complete search history.

(56) References Cited

U.S. PATENT DOCUMENTS

| 5,221,963 | A | * | 6/1993 | Hashimoto et al. | .......... 348/234 |
| 5,270,802 | A | * | 12/1993 | Takagi et al. | ................. 348/655 |
| 5,272,536 | A | * | 12/1993 | Sudo et al. | .................... 348/243 |
| 6,720,999 | B1 | * | 4/2004 | Holberg et al. | ........... 348/222.1 |
| 7,236,190 | B2 | * | 6/2007 | Yanof et al. | .............. 348/222.1 |
| 7,259,786 | B2 | * | 8/2007 | Shimizu | .................. 348/231.6 |
| 2003/0184659 | A1 | * | 10/2003 | Skow | ...................... 348/223.1 |
| 2004/0051790 | A1 | * | 3/2004 | Tamaru et al. | ........... 348/223.1 |

FOREIGN PATENT DOCUMENTS

JP    54095119 A  *  7/1979

\* cited by examiner

*Primary Examiner*—Jason Chan
*Assistant Examiner*—Cynthia Calderon
(74) *Attorney, Agent, or Firm*—Roylance, Abrams, Berdo & Goodman, L.L.P.

(57) ABSTRACT

Apparatus and a method for improving image quality in an image sensor, where a black level of a photographed image is calibrated and luminance of an image signal is expanded within the allowable range of luminance through knee correction for the image signal in which the black level is calibrated. Interpolation for restoring a dead pixel may be achieved before gamma correction for image signal.

14 Claims, 13 Drawing Sheets

APPARATUS AND METHOD FOR IMPROVING IMAGE QUALITY IN IMAGE SENSOR

PRIORITY

This application claims the benefit under 35 U.S.C. §119 (a) of an application entitled "Apparatus and Method for Improving Image Quality in Image Sensor" filed in the Korean Intellectual Property Office on Jun. 29, 2004 and assigned Serial No. 2004-49656, the entire disclosure of which is hereby incorporated by reference.

BACKGROUND OF THE INVENTION

1. Field of the Invention

The present invention relates to an image sensor, and more particularly to an apparatus and a method for improving quality of a photographed image.

2. Description of the Related Art

Recently, image sensors are increasingly being developed due to rapid development of imaging appliances. Herein, the term 'image sensor' is a general term which refers to devices used when photographing an image by using semiconductors which are sensitive to light. Generally, parts of a target object in the natural world have different luminance and different wavelengths. Accordingly, the image sensors convert light energy (photons) obtained by means of the luminance, the wavelength, etc. of light obtained through a lens into an electrical signal (electrons). Such image sensors representatively include a charge coupled device ("CCD") image sensor and a complementary metal oxide semiconductor ("CMOS") image sensor. The two image sensors include a photo detector for generating charges according to intensity of light from the light incident on the image sensors and a circuit for delivering the charges to external devices. Although the above two sensors may generate charges by means of a photo detector through the same procedures, they process the charges differently after generating the charges.

In the CCD image sensor, what transfers charges is an element called "CCD". The CCD image sensor has been mainly employed for a digital camera or a video camera for a long time.

The CMOS image sensor deals with charges by using switching of a CMOS transistor in place of the CCD. Since the CMOS image sensor has a switch for every photo detector, the CMOS image sensor can directly process charges regardless of places. Accordingly, the CMOS image sensor performs faster reading and consumes lower power as compared with the CCD image sensor. In addition, the CMOS image sensor is made similarly to a fabrication process of a computer chip. Therefore, in the CMOS image sensor, image sensor circuits can be arranged together with image processing circuits.

Such a CMOS image sensor has been mainly employed for portable telephones and small sized digital cameras. Recently, since the CMOS image sensor is employed for high-quality digital cameras, the CMOS image sensor is growing as a challenger of the CCD image sensor.

In the meantime, the CMOS image sensor photographs an image in a cell with a pixel unit by using at least one transistor and at least one photo diode. In other words, the CMOS image sensor is an image capture device which amplifies charges generated due to optical/electric conversion of horizontally-arranged photodiodes by means of internal transistors and reads out an image by one pixel through a switch circuit. Thus, since the CMOS image sensor performs an amplification function for every pixel, the CMOS image sensor can obtain high sensitivity and a high SNR. In addition, the CMOS image sensor has a random access function, so that the CMOS image sensor can read out a predetermined pixel by selecting one horizontal signal line and one vertical signal line.

In addition, since the CMOS image sensor is based on a standard CMOS processing technology, a small-sized chip, a light camera, and on-chip including peripheral driving circuits can be realized, and lower consumption of power can be achieved. Additionally, in the CMOS image sensor, an image can be photographed under weak illumination because current is amplified in proportion to signal charges.

However, a digital camera employing the CMOS image sensor cannot provide the best image quality due to the following causes.

First, since elements used for a pixel array part of the CMOS sensor are sensitive to change of a temperature, dark current occurs depending on a changed temperature. The dark current becomes a cause in which an undesired black level is included in an image.

Second, in the digital camera employing the CMOS image sensor, when a target object such as the fluorescent light having great light intensity is photographed, a ghost image appears due to saturation of an image signal.

Third, if interpolation is achieved with respect to an image processed through gamma correction, the optimum value for gamma correction cannot be obtained correspondingly to a dead pixel restored through the interpolation.

SUMMARY OF THE INVENTION

Accordingly, an embodiment of the present invention addresses the above-mentioned problems occurring in the prior art, and an object of exemplary embodiments of the present invention is to provide an apparatus and a method, which may improve image quality of a camera.

It is another object of exemplary embodiments of the present invention to provide an apparatus and a method, which can minimize a phenomenon in which contrast is saturated in a white level.

It is another object of exemplary embodiments of the present invention to provide an apparatus and a method, which can adjust exposure time in order to prevent occurrence of a saturation area and compensate for exposure time through the image signal gain.

It is another object of exemplary embodiments of the present invention to provide an image processing apparatus and a method thereof, which can minimize occurrence of a ghost image by delaying a time point in which an image signal is saturated.

It is another object of exemplary embodiments of the present invention to provide an image sensor and a method, which can perform gamma correction with respect to an image in which dead pixels are restored.

It is another object of exemplary embodiments of the present invention to provide an image processing apparatus and a method, which can use a gain value for white correction for knee correction.

It is another object of exemplary embodiments of the present invention to provide an apparatus and a method, which can measure a black level value by means of pixels, on which light is not incident at photographing, from among pixels included in a pixel array part.

It is another object of exemplary embodiments of the present invention to provide an image processing apparatus and a method, which can perform black level calibration and knee correction with respect to an analog image signal.

It is another object of exemplary embodiments of the present invention to provide an image processing apparatus and a method, which can perform black level calibration and knee correction with respect to a digital image signal.

It is another object of exemplary embodiments of the present invention to provide an image processing apparatus and a method, which can perform knee correction by providing different gain values according to luminance of an image signal.

It is another object of exemplary embodiments of the present invention to provide an apparatus and a method, which can compensate for dark current occurring due to noises.

To accomplish the above objects, an exemplary embodiment of the present invention provides an image processing method for improving image quality in a digital camera which photographs a target object by using predetermined exposure time, converts an optical signal applied through the photographing into an image signal, and outputs the image signal, the image processing method comprising the steps of measuring a black level value caused by dark current and calibrating a black level of the image signal by using the measured black level value, dividing input luminance of the image signal into predetermined sections and providing different gain values to the sections, thereby performing knee correction with respect to the image signal by using the gain value provided to a section including luminance of the image signal having the calibrated black level, receiving the image signal processed through the knee correction and restoring a dead pixel included in the image signal through interpolation, performing gamma correction with respect to the image signal in which the dead pixel is restored, separating a luminance component from a chromaticity component in the image signal processed through the gamma correction and outputting the luminance component and the chromaticity component, receiving the luminance component and outputting exposure time required for the black level calibration and the knee correction; and receiving a color signal and outputting a gain value for the knee correction, wherein the sections are input luminance ranges distinguished by knee points when at least one predetermined reference luminance is employed as a knee point, and have relatively small gain values as the sections approximates to a white saturation time point.

According to another exemplary embodiment of the present invention, there is provided an image processing apparatus for improving image quality in a digital camera which photographs a target object by using predetermined exposure time, converts an optical signal applied through the photographing into an image signal, and outputs the image signal, the image processing apparatus comprising, an image signal calibration part for calibrating a black level of the image signal by using a black level value caused by dark current and providing different gain values to sections distinguishing input luminance of the image signal, thereby performing knee correction with respect to the image signal by using a gain value provided to a section including luminance of the image signal having the calibrated black level, an interpolation and pixel correction part for receiving the image signal processed through the knee correction and restoring a dead pixel included in the image signal through interpolation, a gamma correction part for performing gamma correction with respect to the image signal in which the dead pixel is restored, a color space transformation part for separating a luminance component from a chromaticity component in the image signal processed through the gamma correction and outputting the luminance component and the chromaticity component, an exposure adjustment part for receiving the luminance component and outputting exposure time required for the black level calibration and the knee correction, and a white balance calibration part for receiving a color signal and outputting a gain value for the knee correction, wherein the sections are input luminance ranges distinguished by knee points when at least one predetermined reference luminance is employed as a knee point, and have relatively small gain values as the sections approximates to a white saturation time point.

BRIEF DESCRIPTION OF THE DRAWINGS

The above and other objects, features and advantages of the exemplary embodiment of the present invention will be more apparent from the following detailed description taken in conjunction with the accompanying drawings, in which.

Throughout the drawing figures, like reference numbers will be understood to refer to like elements, features and structures.

DETAILED DESCRIPTION OF EXAMPLARY EMBODIMENTS OF THE INVENTION

Hereinafter, an exemplary embodiment of the present invention will be described in detail with reference to the accompanying drawings. In the following description of an exemplary embodiment of the present invention, a detailed description of known functions and configurations incorporated therein may be omitted for clarity.

In the following description, undesirable image data are removed or restored in order to improve image quality, and the conventional image processing sequence is changed. In other words, according to an aspect of the present invention, a black level of image data is forcedly calibrated by using exposure time, and the black level is corrected by adjusting a color signal gain (G gain, R gain, or B gain). Herein, the black level is generated by the dark current. The dark current may be mainly caused by a rise in temperature due to incident light in a photodiode employed for a CMOS image sensor. Accordingly, the black level can be measured on the basis of the dark current of a photodiode entirely shielding light.

In addition, according to an aspect of the present invention, luminance of an image, which may be input as an image signal, is divided into predetermined sections. The sections have different gains for the image signal, so that image having relatively wide range luminance can be realized. Herein, a gain value in a section nearby a saturation point is given as a relatively-small value.

Also, according to an aspect of the present invention, interpolation for an image signal is primarily achieved, and then, gamma correction is achieved with respect to the image signal having dead pixels restored through the interpolation. If correction pixel values for the gamma correction is found from normal pixels, and then, if dead pixels are restored by using the correction pixel values, it is possible to prevent occurrence of an error of a gamma correction in a process of displaying the image signal.

Hereinafter, an operation according to an exemplary embodiment of the present invention will be described in detail with reference to the accompanying drawings.

Figure 1:
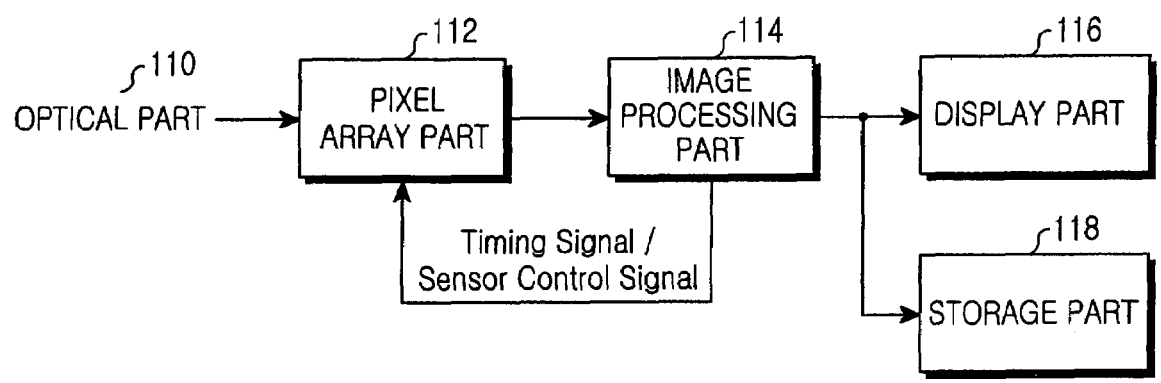
FIG. 1 illustrates a conventional image processing procedure.

FIG. 1 illustrates conventional image processing procedure.

It is assumed that a CMOS image sensor is employed in the image processing procedure of FIG. 1. However, it should be noted that those skilled in the art can appreciate that other image processing device for the image processing procedure may be employed.

Referring to FIG. 1, an optical part 110 photographs a target object through a lens and outputs light energy (photons) obtained through the photographing. A pixel array part 112 includes from tens of thousands of pixels to hundreds of thousands of pixels. The pixel array part 112 converts light incident through the lens of the optical part 110 into an electrical signal (electrons) which is an analog signal and outputs the electrical signal. Herein, the pixel array part 112 operates by means of a timing signal and a sensor control signal provided from an image processing part 114. Herein, time for reception of the light can be controlled by means of the timing signal. The time for reception of the light greatly influences the hue and the luminance of an image to be displayed later. In addition, the timing signal is used for black level correction and knee correction according to one embodiment of the present invention.

The image processing part 114 processes an image including colors of red (R), green (G), and blue (B) by means of the electrical signal of the pixel array part 112. After that, a processed image obtained through the image processing is output. The image processing part 114 generates the timing signal and the sensor control signal for correcting the output image signal so as to provide these signals to the pixel array part 112.

An image output from the image processing part 114 is displayed through a display part 116 or is stored in a storage part 118. The display part 116 includes various display windows (CRT, LCD, etc.) and a structure for processing the image and displays the image through the display windows. The image stored in the storage part 118 can be variously applied later. In the mean time, although it is not shown in FIG. 1, the image output from the image processing part 114 or the image stored in the storage part 118 may be printed through a printer.

Figure 2:
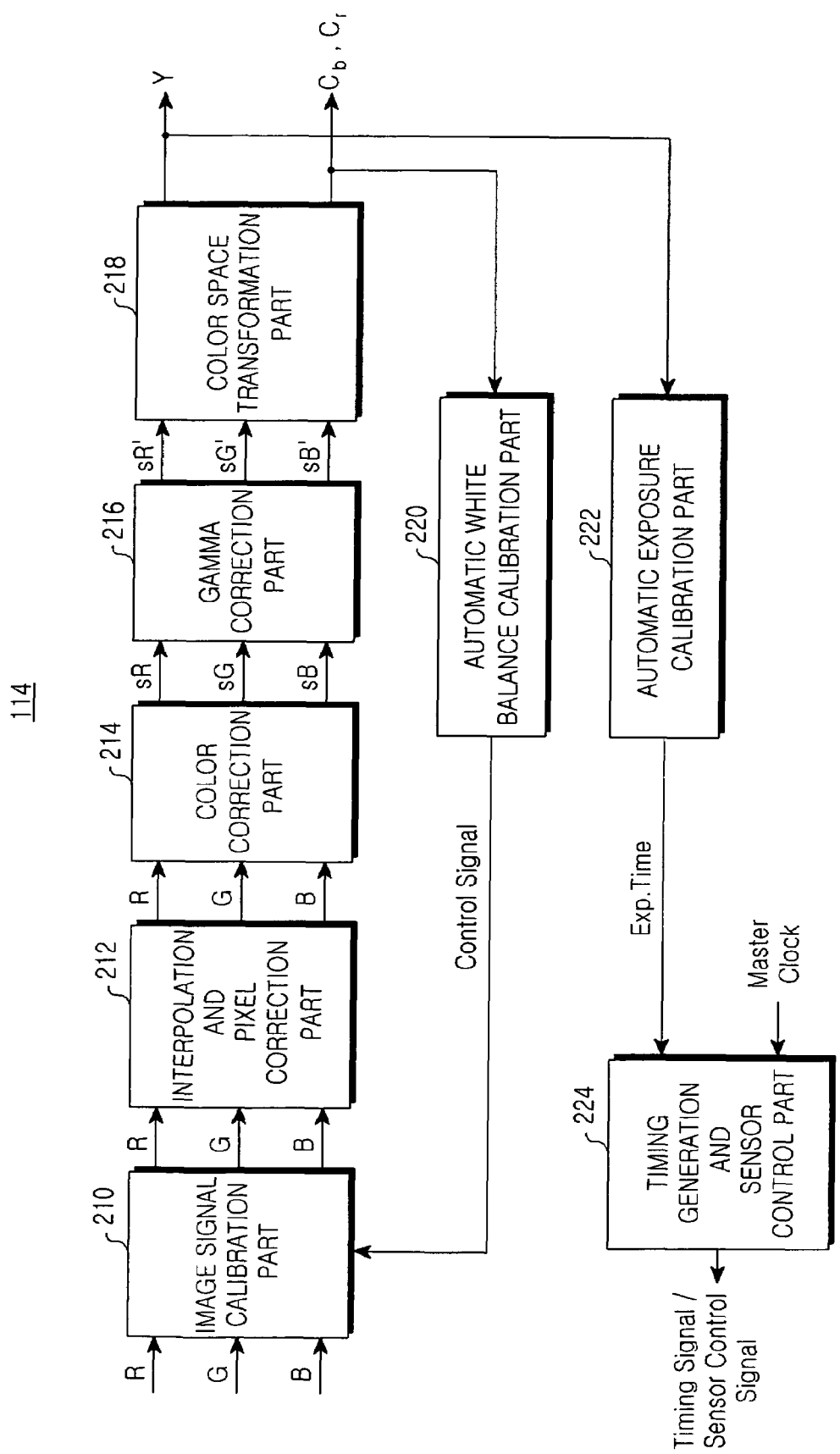
FIG. 2 is a block diagram showing a structure of an image processing apparatus according to an embodiment of the present invention.

FIG. 2 is a block diagram illustrating a structure of an image processing part 118 according to an exemplary embodiment of the present invention. In describing an exemplary embodiment with reference to FIG. 2, detailed description of some of the components according to this exemplary embodiment are omitted.

An image signal calibrating part 210 receives an image signal from the pixel array part and a control signal for calibrating the image signal. The control signal includes gain values of both an R signal and a B signal. Although the gain values of the R signal and the B signal may be manually calibrated, the gain values are assumed to be automatically calibrated according to an exemplary embodiment of the present invention. The gain values of the R signal and the B signal are used for knee correction as well as white correction. The image signal calibrating part 210 performs white correction, black level correction, and knee correction by means of the control signal.

The white correction calibrates gains of the R signal and the B signal from among image signals, thereby enabling an output of an image signal having a required white color. Generally, a gain value of a G signal except the R signal and the B signal is fixed. Accordingly, in order to achieve the white correction, the gain values of both the R signal and the B signal may be calibrated correspondingly to the fixed gain value of the G signal. Generally, when the ratio between the R, G and B signals has a uniform value, a white color is obtained.

The black level calibration calibrates a black level of an image signal generated by the dark current, thereby enabling realization of a desired black color. If the black level of the image signal is calibrated, an output image signal in a predetermined section may not be obtained. Accordingly, black level calibration reflecting this must be achieved.

The knee correction prevents occurrence of a ghost image, which is an image abnormally displayed due to saturation of an image signal when a target object such as lightening is photographed. To this end, the knee correction allows the gradient of a curve representing a relationship between an input image signal and an output image signal to change with respect to a specific knee point. In other words, the knee correction allows a first gradient, which is formed from a starting point of the curve to a predetermined knee point before a time point in which an image starts to be saturated, to differ from a second gradient, which is formed to an input image signal having the maximum allowable intensity from the knee point. Herein, the second gradient must be relatively slow as compared with the first gradient. In addition, there may be plural knee points. If there are plural knee points, the curve may be formed with various gradients corresponding to the plural knee points. Accordingly, when the knee correction is achieved, a predetermined output image signal, which can be expressed, may be found with respect to an input image signal in a conventional saturation area.

Hereinafter, detailed operations for the white correction, the black level calibration, and the knee correction will be described.

An image signal output from the image signal calibration part 210 is provided to an interpolation and pixel correction part 212. Herein, the interpolation and pixel correction part 212 performs interpolation for dead pixels of the image signal. In addition, the interpolation and pixel correction part 212 corrects pixels of the image signal. The dead pixels indicate lost pixels from among pixels forming an image.

Herein, through the interpolation, information of the dead pixels can be deduced from information about neighboring pixels.

Algorithms for the interpolation are largely classified into nonadaptive algorithms and adaptive algorithms. The nonadaptive algorithms perform interpolation for all pixels with a fixed pattern. These nonadaptive algorithms are easily performed and have little amount of calculation. The adaptive algorithms are used for the estimation of lost pixel values by using characteristics of the most effective neighboring pixels. Although the adaptive algorithms require more calculations, the adaptive algorithms enable acquisition of a better image as compared with the nonadaptive algorithms. In the meantime, the nonadaptive algorithms include nearest neighbor replication, bilinear interpolation, median interpolation, and gradation interpolation. The adaptive algorithms include a pattern matching based interpolation algorithm, interpolation using a threshold-based variable number of gradients, and edge sensing interpolation. An exemplary embodiment of the present invention is realized regardless of types of interpolation algorithms.

An image signal from the interpolation and pixel correction part 212 is provided to a color correction part 214. The color correction part 214 changes the image signal into a standard image signal by correcting the image signal. In other words, the color correction part 214 corrects an input R signal, an input G signal, and an input B signal into a standard sR signal, a standard sG signal, and a standard sB signal. In following Equation 1, a generalized scheme for color correction is suggested.

$$M_{CSC} = M_{sRGB} \cdot M_C^{-1} \quad \text{Equation 1}$$

Herein, the $M_{CSC}$ denotes a transfer characteristic matrix of a standard camera for finding a transfer characteristic of a nonstandard camera identical to that of the standard camera, and the $M_C^{-1}$ denotes an inverse transfer characteristic matrix of the nonstandard camera. Herein, on the assumption that $$M_C^{-1} = \begin{bmatrix} 2.4611 & -0.2058 & -0.2775 \\ -0.3131 & 2.5163 & 0.3323 \\ -0.2260 & 1.3322 & 1.3322 \end{bmatrix}$$

$$M_{sRGB} = \begin{bmatrix} 0.4124 & 0.3576 & 0.1805 \\ 0.2126 & 0.7151 & 0.0721 \\ 0.0193 & 0.1192 & 0.9505 \end{bmatrix},$$

the $M_{CSC}$ is obtained as matrix $$\begin{bmatrix} 0.8622 & 1.0603 & 0.2448 \\ 0.2831 & 1.8538 & 0.2748 \\ -0.2045 & 1.5884 & 1.3005 \end{bmatrix}$$

through Equation 1.

Figure 11:
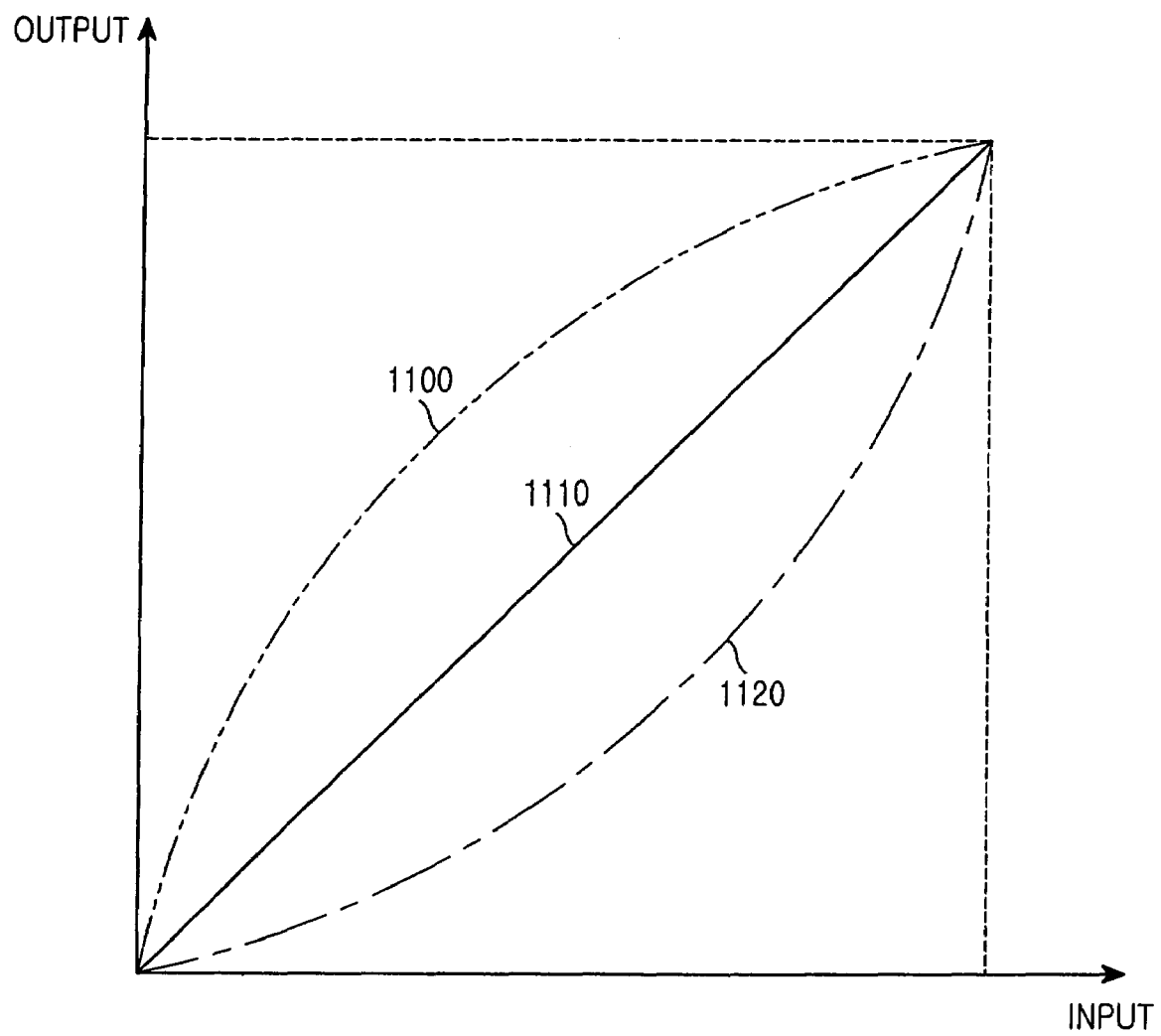
FIG. 11 is a graph for explaining the concept of a conventional gamma correction.

The standard image signals are provided to a gamma correction part 216. Generally, the "gamma" is a yardstick representing a contrast state. The "gamma" denotes the gradient of a characteristic curve, that is, change of density/change of exposure dose. In display devices such as a CRT, etc., a relationship between input voltage of an image signal and electron beam current is nonlinear, and a relationship between luminance of an image and beam current is linear. Accordingly, the gamma correction part 216 performs gamma correction with respect to the standard image signals on the basis of a nonlinear characteristic of the display device in such a manner that a final image signal may have linearity. In other words, the gamma correction part 216 corrects the nonlinear characteristic of the display device. This allows the standard image signal to have a nonlinear curve enabling correction of nonlinearity of the display device. FIG. 11 illustrates an example of the correction. In FIG. 11, reference numeral 1120 is a curve showing a nonlinear characteristic of the display device, and reference numeral 1110 is a straight line for an image signal to be finally obtained. Also, reference numeral 1100 is a curve showing a nonlinear characteristic of the image signal gamma-corrected in order to compensate for the curve of reference numeral 1120. As a result, the gamma correction part 216 corrects the image signal in such a manner that the image signal has the curve of the reference numeral 1100.

The gamma-corrected image signals (sR', sG', and sB') are provided to the color space transformation part 218. The color space transformation part 218 transforms pixels of the gamma corrected image signal in order to output the number of frames required according to seconds. The color space transformation part outputs a luminance component (Y) and chromaticity components (Cb and Cr). The Y signal corresponds to the luminance component of an output image signal and the Cb signal and the Cr signal correspond to the chromaticity components of the output image signal. Accordingly, the Cb signal and Cr signal are provided to an automatic white balance calibration part 220 and the Y signal is provided to an automatic exposure calibration part 222.

The exposure calibration part 222 detects intensity of light input through a lens by using the Y signal and adjusts exposure time for controlling an open state of an aperture on the basis of the intensity of the light. For example, when a whole output image is dark due to weak intensity of light, the exposure calibration part 222 increases the exposure time. In contrast, when a ghost image is output due to strong intensity of light, the exposure calibration part 222 decreases the exposure time. In the meantime, when the exposure time is adjusted, the dark current, which is a cause of generation of a black level, must be considered. This is a result according to black level calibration suggested in the present invention. The exposure time may be divided into predetermined steps (usually, eight steps (1/50 s to 1/10000 s) or fifteen steps). Universally, when an image is processed, a dark image is easily compensated, but a ghost image can be hardly compensated. Therefore, according to an exemplary embodiment of the present invention, the exposure calibration part 222 receives an image signal of an overall dark image and manually reduces the exposure time in order to compensate for the dark image. Herein, an amount of exposure time to be manually reduced can be determined by a black level generated by the dark current.

The exposure time is input to a timing generation and sensor control part 224. The timing generation and sensor control part 224 receives a master clock as well as the exposure time. Accordingly, the timing generation and sensor control part 224 generates a timing signal and a sensor control signal by means of the exposure time and the master clock.

Figure 6:
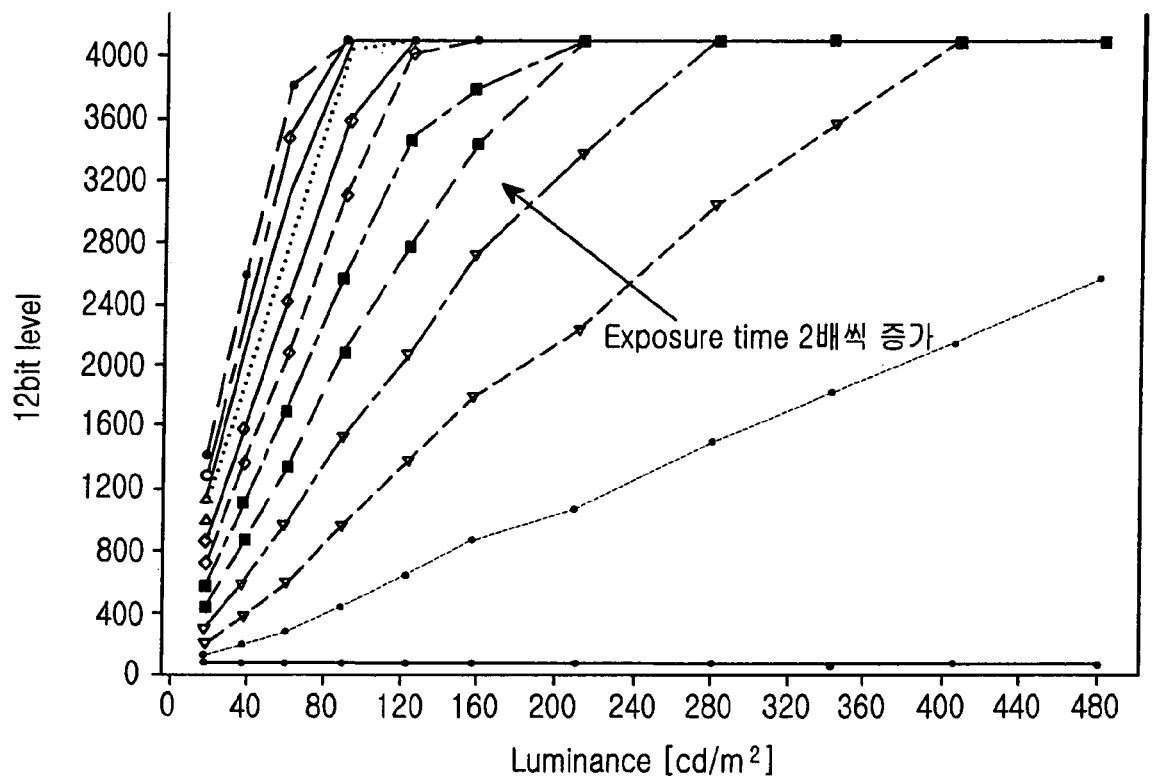
FIG. 6 is a graph showing a relationship between an input image signal and luminance according to exposure time according to an embodiment of the present invention.

FIG. 6 illustrates that, for example, knee curves according to a relationship between an input image signal and luminance represented as 12 levels change according to adjustment of exposure time. The graphs show change according to doubly increasing exposure time. As shown in FIG. 6, as the exposure time increases, the gradients of the knee curves become larger. Herein, the larger the gradient of the knee curve is, the lower the value of luminance saturating an output image is.

Figure 7:
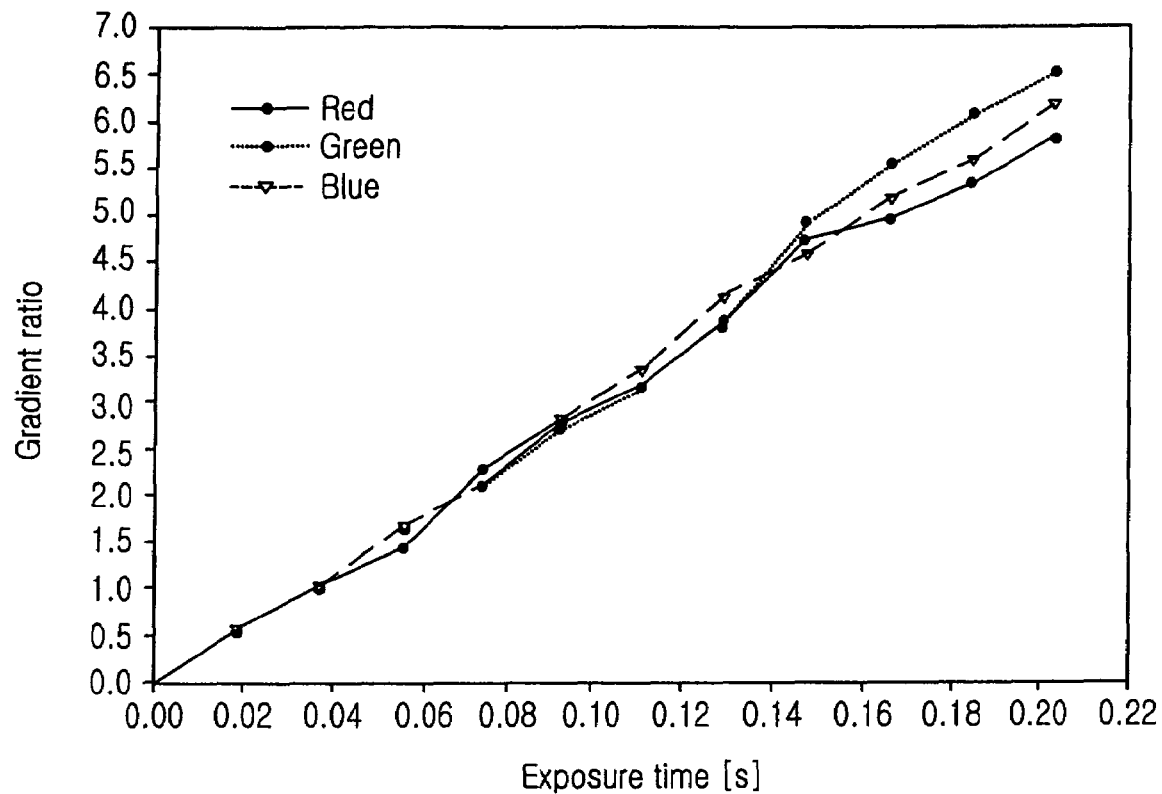
FIG. 7 is a graph showing a relationship between exposure time and a gradient ratio according to an embodiment of the present invention.

FIG. 7 is a graph showing an exemplary relationship between exposure time and a gradient ratio. As shown in FIG. 7, as the exposure time increases, the gradient ratio increases. In following Equation 2, the relationship between the exposure time and the gradient ratio is shown.

$$\alpha = \frac{\text{Gradient of } AutoExp.Time}{\text{Gradient of } DefaultExp.Time} \qquad \text{Equation 2}$$

Herein, the 'Gradient of AutoExp.Time' denotes an automatically adjusted exposure time change rate, and the 'Gradient of DefaultExp.Time' denotes a basically set exposure time change rate.

The automatic white balance calibration part 220 calibrates the gain values for white balance of the image signal by means of the $C_b$ signal and $C_r$ signal. Herein, the gain values include an R gain value for correcting the R signal and a B gain value for correcting the B signal. A gain value of the G signal is fixed as a predetermined value. Description about a scheme for fixing the gain value of the G signal will be given in detail when the knee correction is described. In the meantime, the gain value is adjusted in consideration of a color temperature of the circumference when the intensity of light is not enough adjusted only with the exposure time. In addition, according to an exemplary embodiment of the present invention, the gain value must be adjusted in consideration of the knee correction.

Figure 3:
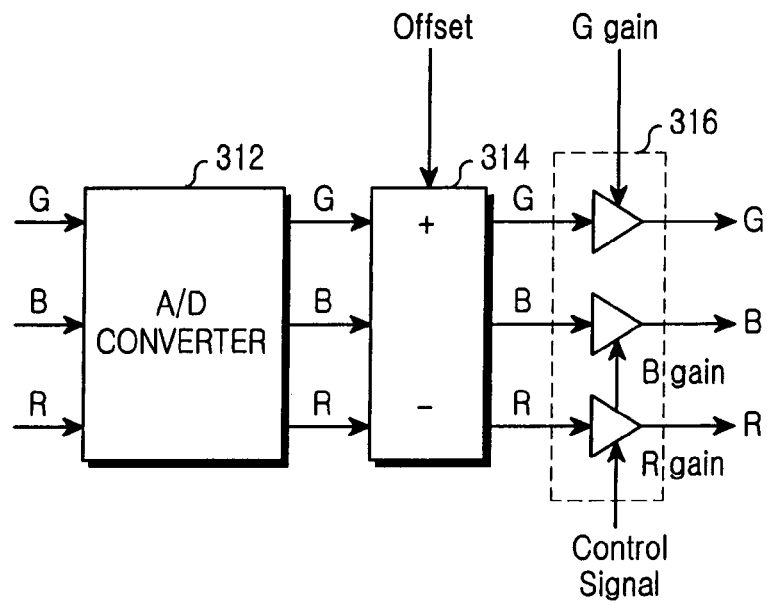
FIGS. 3 to 5 are block diagrams showing examples of the image signal calibration part according to an embodiment of the present invention.
Figure 4:
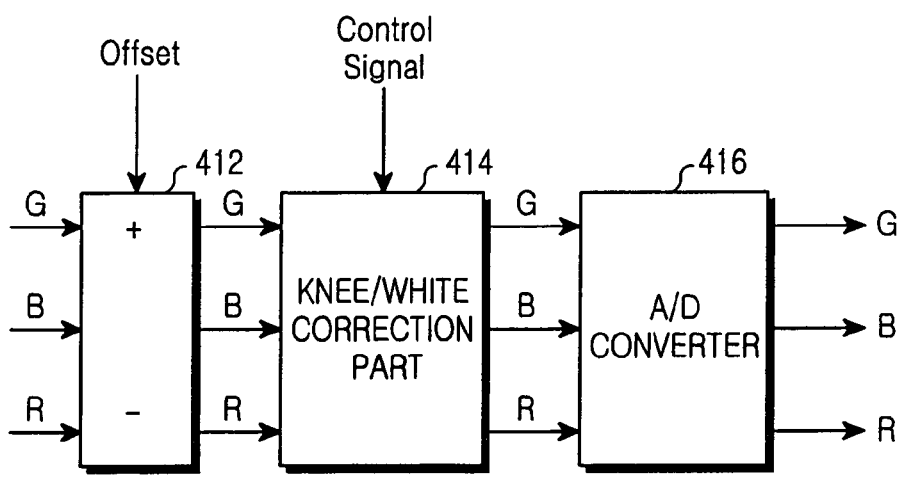
Figure 5:
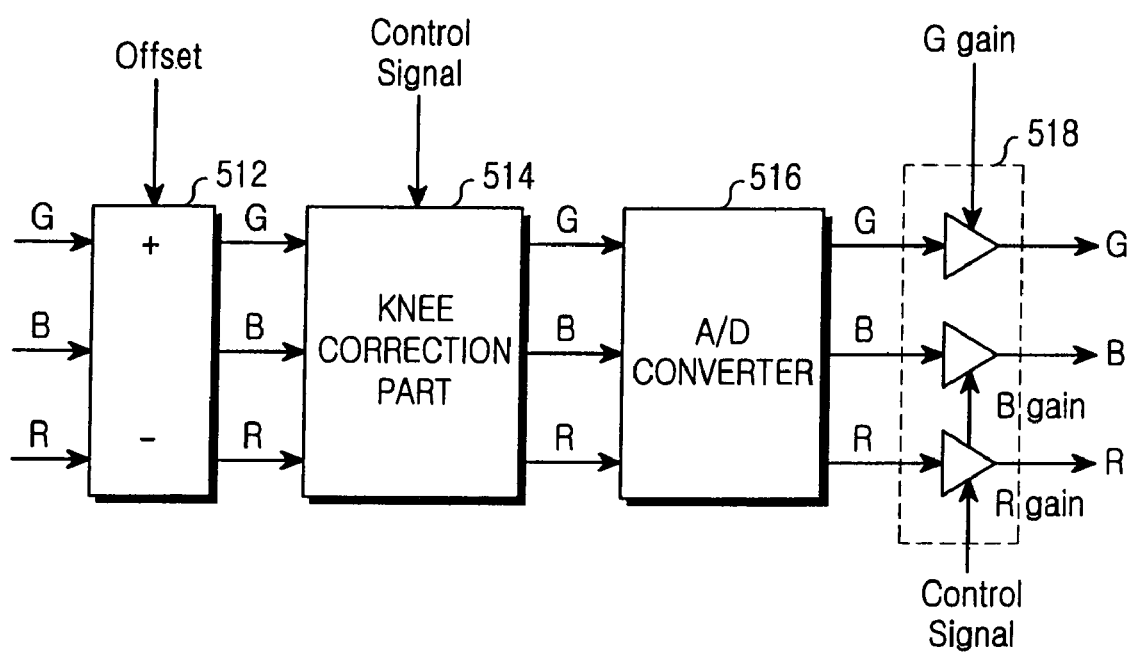

FIGs 3 and 5 are block diagrams showing examples of the image signal calibration part 210 according to one embodiment of the present invention. FIG. 3 is a block diagram showing an example of the image signal calibration part 210 for performing the black level calibration, the knee correction, and the white correction for a digital image signal. FIG. 4 is a block diagram showing an example of the image signal calibration part 210 for performing the black level calibration, the knee correction, and the white correction for an analogue image signal. FIG. 5 is a block diagram showing an example of the image signal calibration part 210 for performing the black level calibration for an analogue image signal and the knee correction and the white correction for a digital image signal.

Referring to FIG. 3, R, G, and B analogue signals provided from the pixel array part are input to an analogue/digital converting part (A/D converter) 312. The A/D converter 312 converts the R, C, and B analogue signals into digital signals. The digital signal from the A/D converter 312 includes 12 bits by way of example. The R, C, and B digital signals are input to a black level calibration part 314. The black level calibration part 314 receives offsets corresponding to black level calibration values so as to perform black level calibration with respect to the R, G, and B digital signals. Herein, black levels may be calibrated through compensation using exposure time after manually subtracting the offsets from the R, G, and B signals, or through a generalized formula. In addition, the black levels for the R, G, and B signals may be calibrated by means of a predetermined calibration table. In the mean time, the offsets are determined by using the previously measured black levels. The black levels can be measured by means of an output image signal in a shielded state in which light is not incident through a lens. Hereinafter, an example for measurement of the black levels will be described in detail.

The R, G, and B signals having calibrated black levels are input to corresponding amplifiers from among plural amplifiers included in a white correction part 316.

The white correction part 316 calibrates levels of the R, G, and B signals under lightening given in such a manner that a white object can be expressed in an exact white color. This is called white balance correction. A color temperature for a target object can be exactly realized through the white balance correction. Accordingly, the white correction part 518 includes amplifiers for calibrating levels of the R, G, and B signals. The amplifiers perform the white balance correction by multiplying the R, G, and B signals by gain values (a G gain, an R gain, and a B gain), respectively. Accordingly, the gain values are provided to the amplifiers, respectively. In other words, the G gain is provided to an amplifier to which the G signal is input, the B gain is provided to an amplifier to which the B signal is input, and the R gain is provided to an amplifier to which the R signal is input. The G gain has a fixed value, and the B and R gains are calibrated correspondingly to the fixed G gain. Herein, the B and R gains are determined by the above-mentioned white balance calibration part. The amplifiers perform the white correction and the knee correction by calibrating the intensity of the R, G, and B signals. A detailed scheme for determining the B and R gains and a detailed operation according to the knee correction will be described later.

As described above, the image signal calibration part according to the structure of FIG. 3 performs the black level calibration and the knee correction, as well as the white correction with respect to a digital image signal. This can be realized through the minimum change of the conventional structure. However, this structure has limitations against correction because the black level calibration and the knee correction are achieved with respect to a digital image signal.

Referring to FIG. 4, R, G, and B analog signals provided from the pixel array part are input to a black level calibration part 412. The black level calibration part 412 receives offsets corresponding to black level calibration values so as to perform black level calibration with respect to the R, G, and B analog signals. The black level calibration may be achieved as described above.

The R, G, and B signals having the calibrated black levels are input to a knee/white correction part 414. Predetermined gain values are provided to the knee/white correction part 414 as control signals. In other words, an R gain value, a G gain value, and a B gain value for the knee correction and the white correction are provided. The G gain value has a fixed predetermined value, and the B gain value and the R gain value are adjusted correspondingly to the fixed G gain. The B gain value and the R gain value are provided from the white balance calibration part. The white correction and the knee correction are achieved by adjusting the intensity of the R, G, and B signals.

The R, G, and B signals corrected through the knee correction and the white correction are input to an A/D converter 416. The A/D converter 416 converts the analog R, G, and B signals into digital signals.

As described above, the image signal calibration part according to the structure of FIG. 4 performs the black level correction and the knee correction as well as the white correction with respect to analog image signals. This structure has no limitation against correction because the black level calibration and the knee correction are achieved with respect to analog image signals.

Referring to FIG. 5, R, G, and B analog signals provided from the pixel array part are input to a black level calibration part 512. The black level calibration part 512 receives offsets corresponding to black level calibration values so as to perform black level calibration with respect to the R, G, and B analog signals. The black level calibration may be achieved as described above.

The R, G, and B signals having the calibrated black levels are input to a knee correction part 514. Predetermined gain values are provided to the knee correction part 514 as control signals. In other words, an R gain value, a G gain value, and a B gain value for the knee correction are provided. The G gain value has a fixed predetermined value, and the B gain value and the R gain value are calibrated correspondingly to the fixed G gain. The B gain value and the R gain value are provided from the white balance calibration part. The white correction is achieved through calibration for the intensity of the R, G, and B signals.

The R, G, and B signals corrected through the knee correction are input to an A/D converter 516. The A/D converter 516 converts the analog R, G, and B signals into digital signals.

The converted R, G, and B digital signals are input to corresponding amplifiers from among plural amplifiers included in a white correction part 518. Accordingly, predetermined gain values are provided to the amplifiers, respectively. In other words, a G gain value is provided to an amplifier to which the G signal is input, the B gain is provided to an amplifier to which the B signal is input, and the R gain is provided to an amplifier to which the R signal is input. The G gain value has a fixed value, and the B and R gain values are calibrated correspondingly to the fixed G gain value. The B and R gain values are determined by the above-mentioned white balance calibration part. The amplifiers perform the white correction by adjusting the intensity of the R, G, and B signals.

As described above, the image signal calibration part according to the structure of FIG. 5 performs the black level correction and the knee correction with respect to analog image signals, so that this structure has no limitation against correction. Also, the white correction may be achieved with respect to digital signals in the same way as in the conventional structure, so that the conventional structure can be maintained as much as possible.

Hereinafter, functions according to an exemplary embodiment of the present invention will be described with reference to the above-mentioned structures. In particular, examples of the black level calibration, the knee correction, and the gamma correction will be described in detail.

1. Black Level Calibration

An exemplary embodiment of the present invention suggests a method for measuring a black level value of a CMOS image sensor, and then, for correcting the black level for image data by mans of the measured black level value. Herein, the black level is generated by the dark current. Accordingly, the black level can be measured on the basis of dark current of a photodiode under an entirely light shielded environment. In the meantime, black level correction using the measured black level value is achieved in the blocks 314, 412, and 512. The block 314 of FIG. 3 performs black level correction in a digital domain, and the block 412 of FIG. 4 and the block 512 of FIG. 5 perform black level correction in an analog domain. The offsets in the structures correspond to correction values calculated by using black level values measured for black level correction.

Hereinafter, an operation for measuring a black level and calibrating a black level through the measured black level will be described in detail with reference to the accompanying drawings.

Figure 8:
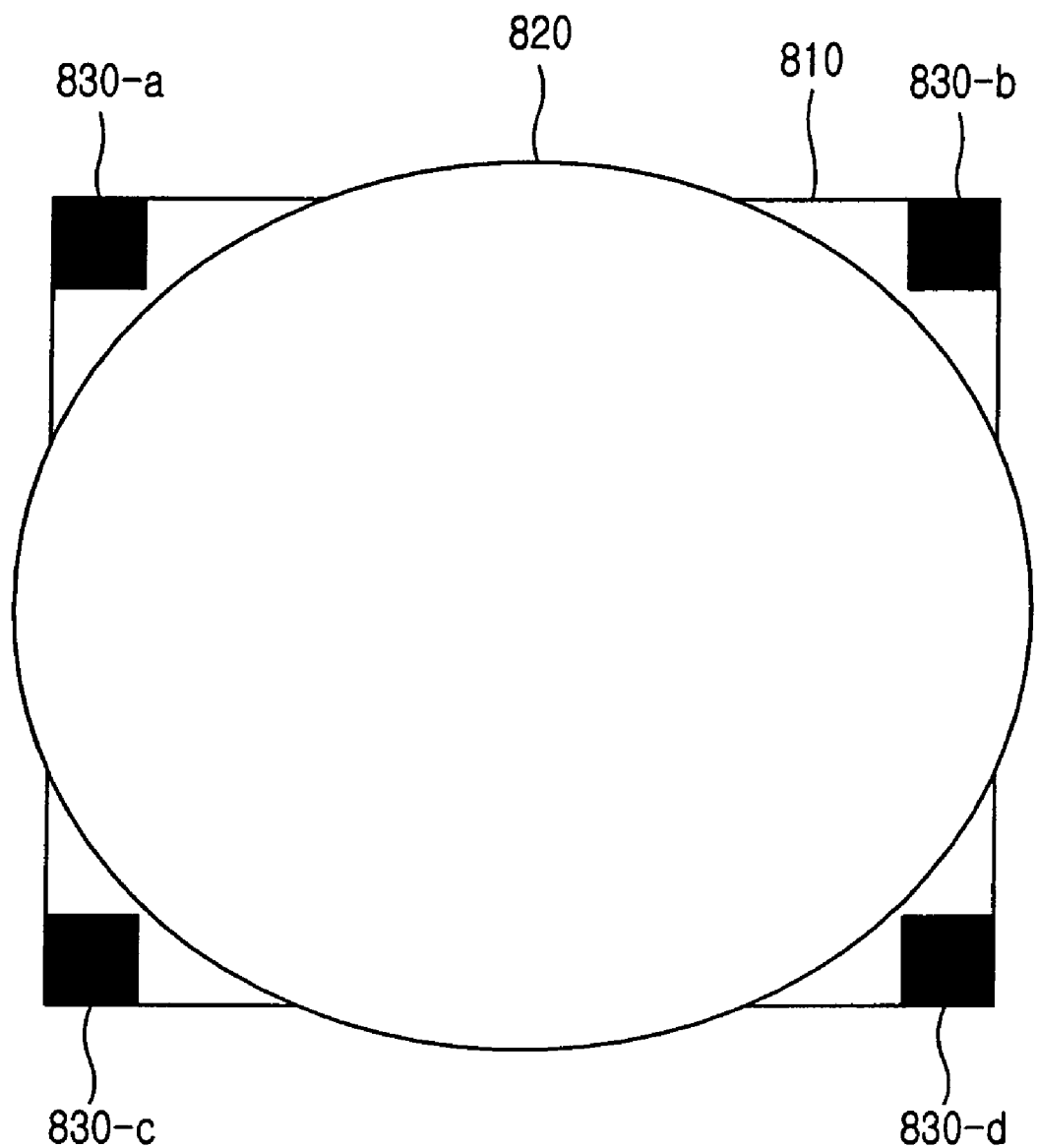
FIG. 8 illustrates a method for measuring a black level according to an embodiment of the present invention.

FIG. 8 illustrates a method for measuring a black level according to an exemplary embodiment of the present invention. As shown in FIG. 8, a cylindrical lens barrel 820 receiving light is attached to an upper part of a pixel layer 810. Herein, while the pixel layer 810 is formed in a square type, the lens barrel 820 is formed in a cylinder type. Accordingly, pixels 830-*a*, 830-*b*, 830-*c*, and 830-*d* on which light is not incident appear on the vertex sides of the pixel layer 810. The pixels 830-*a*, 830-*b*, 830-*c*, and 830-*d* on which light is not incident, that is, light is shielded can be used as areas for measuring black level values. Therefore, according to the present invention, black level values of image data output from the light-shielded pixels 830-*a*, 830-*b*, 830-*c*, and 830-*d* may be regarded as measured black level values. In other words, a desired black level value may be obtained by using the average value of input luminance of red, green, and blue found from the light-shielded pixels 830-*a*, 830-*b*, 830-*c*, and 830-*d*.

If the black level value is measured, the measured black level value is subtracted from input luminance values of image data output from the pixel layer 810. In the meantime, if the measured black level value is commonly subtracted from input luminance values of red, green, and blue included in whole image data, the luminance of a whole image becomes dark. Accordingly, a black level for an input luminance value (InImg[y][x]) of the whole image data is corrected by using following Equation 3.

$$OutImg[y][x] = \frac{InImg[y][x] - Low}{255 - Low} \times 255 \qquad \text{Equation 3}$$

Herein, the "InImg[y][x]" denotes the input luminance value of the image data, the "OutImg[y][x]" denotes the output luminance value of the image data, the "Low" denotes the measured black level value. It is assumed that the maximum output luminance value of the image data is 255 in Equation 3.

For example, on the assumption that the black level value is 50 and the maximum output luminance value is 255, image data having the corrected black level can be linearly expressed in the range of luminance values between 0 and 255. In other words, image data having an input luminance value between 0 and 50 are corrected into image data having an output luminance value of 0. In the meantime, image data having an input luminance value between 51 and 255 are corrected into image data having the output luminance value found by means of Equation 3. This may solve the problem that the whole image is dark due to improvement of color contrast as well as black level correction.

Figure 9:
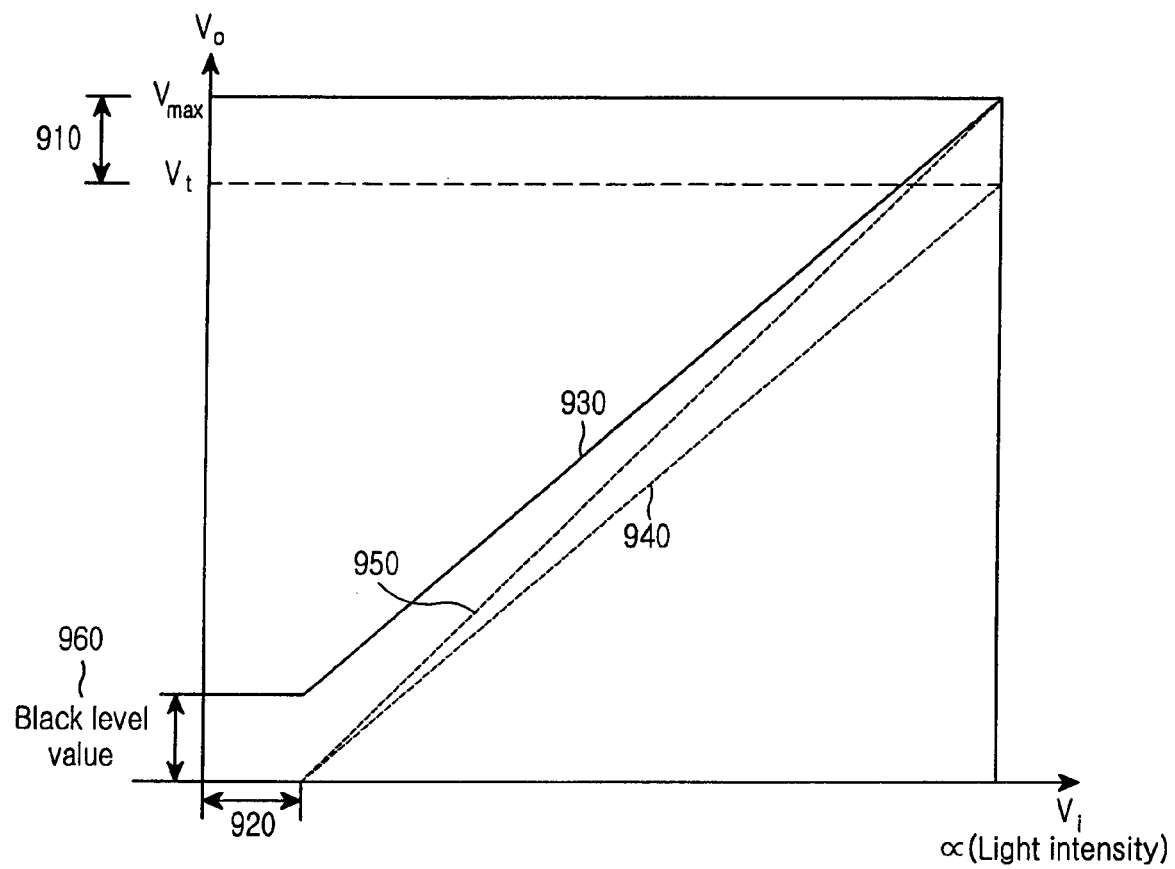
FIG. 9 is a graph showing a relationship between an input luminance and an output luminance of image data through black level calibration according to an embodiment of the present invention.

FIG. 9 is a graph showing an exemplary relationship between an input luminance and an output luminance of image data according to the above-suggested black level calibration.

Reference numeral 930 illustrates a first line showing a relationship between input luminance ($V_i$) and output luminance ($V_O$) when a black level is not corrected. Through the first line, output luminance of a predetermined black level 960 corresponding to input luminance of a perfect black color is obtained. Meanwhile, in a predetermined interval (reference numeral 920) of an input luminance axis, output luminance of a constant black level value 960 is always obtained.

If the constant black level value 960 is uniformly subtracted from output luminance values corresponding to all input luminance values in order to correct the black level value 960, a second line shown with reference numeral 940 may be obtained. However, if the black level value has been corrected as described above, output luminance corresponding to a predetermined interval ($V_{max}-V_t$) is not achieved as shown with reference numeral 910.

Reference numeral 950 illustrates a third line which can be obtained when black level correction is achieved enough to achieve output luminance corresponding to the predetermined interval 910. As shown in the third line 950, for input luminance of the predetermined level 920, output luminance corresponding to a perfect black color is output, and for all input luminance beyond the predetermined level 920, all output luminance between 0 and $V_{max}$ can be achieved. The third line 950 can be obtained through Equation 3 defined above.

As described above, only the scheme for correcting the black level for the whole image data has been described. However, it is well known to those skilled in the art that exemplary embodiments of the present invention can be realized in such a manner that black level values are found with respect to red, green, and blue included in image data, respectively, and then, black level correction for the red, the green, and the blue is achieved by using the black level values.

In addition, the second line 940 can be changed into the third line 950 by using exposure time without Equation 3. To this end, the exposure time may be increased. The change of output luminance for input luminance according to the exposure time has been already described.

It is assumed that the above-mentioned black level correction is achieved in a digital domain. Accordingly, when the measured black level value is subtracted with respect to all input luminance, there may exist output luminance which is not expressed. If black level correction is achieved in an analog domain, the measured black level can be uniformly subtracted with respect to all input luminance. This is because all output luminance is achieved even though the measured black level is equally subtracted with respect to all input luminance in the analog domain.

2. Knee Correction

In an exemplary embodiment of the present invention, an area in which an input image can be expressed may be wide by delaying a time point in which a ghost image appears due to saturation of an output image. To this end, at least one knee point is found, and the gradient of a knee curve changes with respect to the knee point. Herein, the gradient of the knee curve after the knee point must be relatively small as compared with the gradient of the knee curve before the knee point. This is necessary in order to cause the output image to be slowly saturated after the knee point. When there are plural knee points, the knee curve may change with various gradients. The positions of the knee points may be automatically changed according to the luminance of a target object. In addition, gradients according to intervals formed by knee points can be adjusted by using the gain value of an image signal.

Knee correction according to an exemplary embodiment of the present invention is achieved in the blocks 316, 414, and 514 in FIGS. 3, 4, and 5. The block 316 in FIG. 3 performs knee correction in a digital domain, and the blocks 414 and 514 in FIGS. 4 and 5 perform knee correction in an analog domain. The control signal in the structure corresponds to the gain value of an image signal calculated for knee correction.

In the meantime, knee correction in the digital domain must be distinguished from knee correction in the analog domain. This is because signal processing in the digital domain is restricted. Hereinafter, knee correction will be described by distinguishing the digital domain from the analog domain.

Hereinafter, an operation for knee correction will be described in detail with reference to the accompanying drawings.

Figure 10:
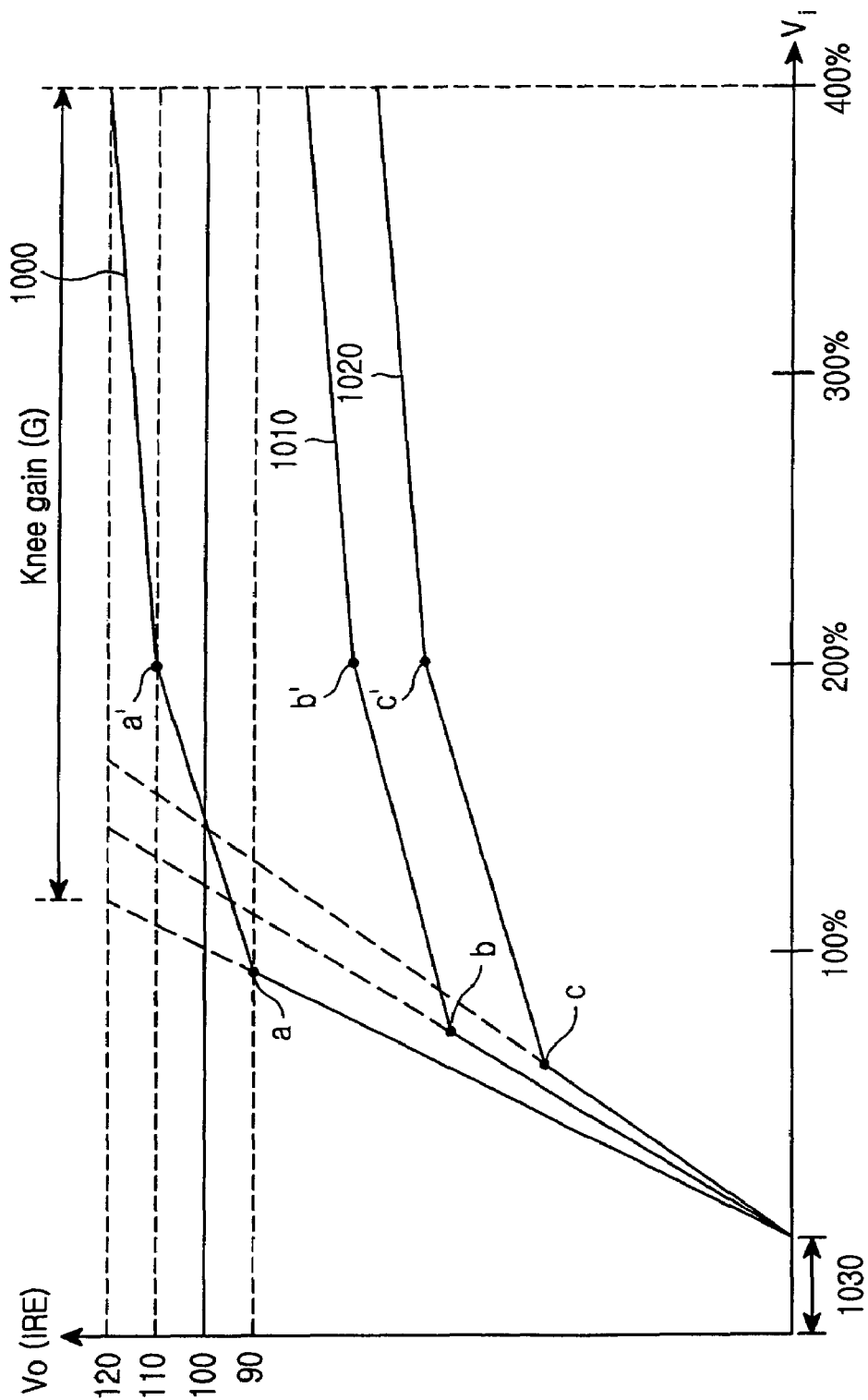
Fig 10 is a diagram illustrating a relationship between an input luminance and an output luminance through knee correction according to an embodiment of the present invention.

FIG. 10 is a graph showing a relationship between inputs (light intensity) and outputs (IRE; institute of Ratio Engineers) of R, G, and B signals through knee correction suggested according to an exemplary embodiment of the present invention. In FIG. 10, two knee points are used for each of the R signal, the G signal and the B signal. In other words, a G curve 1000 has two knee points marked as a and a', an R curve 1010 has two knee points marked as b and b', and a B curve 1020 has two knee points marked as c and c'. Herein, knee correction is identically achieved with respect to all of the R signal, the G signal, and the B signal. Therefore, knee correction will be described below with respect to the G curve.

Meanwhile, in FIG. 10, output image signals between 0 IRE and 120 IRE can be obtained. Generally, when the highest voltage level and the lowest voltage level are divided with a predetermined unit, the unit is called the "1RE". For example, if the highest voltage level and the lowest point are normalized to '1' volt, the one IRE corresponds to 0.00714 V. In the meantime, inputs (light intensity) of the R signal, the G signal, and the B signal can be matched with output image signals having a black level of a perfect black color in a predetermined area 1030 in consideration of the above-described black level calibration. In addition, R, G, and B curves, which are not subject to the knee correction suggested according to the present invention, are marked as dotted lines such that the R, G, and B curves can be distinguished from R, G, and B curves which have been subject to knee correction.

Referring to FIG. 10, in the G curve, a first knee point a matches with an output of 90 IRE, and a second knee point a' matches with an output of 110 IRE. A first gradient for a first interval between a starting point and the first knee point a of the G curve is determined depending on the starting point and the first knee point a. A second gradient for a second interval between the first knee point a and a second knee point a' is determined depending on both the first knee point a and the second knee point a'. A third gradient for a third interval between the second knee point a' and a saturation point is determined depending on the second knee point a' and the saturation point.

The magnitudes of the determined gradients are determined in order of the first gradient, the second gradient, and the third gradient. In other words, the first gradient has the greatest value, the second gradient has a median value, and the third gradient has the smallest value. Therefore, the change ratio of an output image signal to an input image signal is the greatest in the first interval, and the change ratio of an output image signal to an input image signal is the smallest in the third interval.

It can be understood that the graph according to the present invention may have a predetermined gain differently from the conventional graph by providing various gradients to the intervals as described above. The reference numeral 1030 of FIG. 10 represents a knee gain obtained through the knee correction. In the conventional technology, the input image signal area corresponding to the knee gain is a saturation area, and an image in the saturation area cannot be expressed.

The knee correction described with reference to FIG. 10 can be employed in the analog domain. In other words, there is no limitation against an input image signal in FIG. 10. However, if knee correction is achieved in the digital domain, there is limitation against an input image signal. In detail, since a saturation point is predetermined in the digital domain, it is impossible to move the predetermined saturation point when the knee correction is achieved in the digital domain. Accordingly, the gradient of a knee curve cannot be finely calibrated differently from the knee correction described with reference to FIG. 10. However, only adjustment of a gradient is limited, and effects according to knee correction suggested in the present invention can be sufficiently obtained.

In an operation for knee correction suggested in an exemplary embodiment of the present invention, a global gain and exposure time are determined and stored through automatic exposure adjustment. Thereafter, an image signal is acquired by means of the stored global gain, the stored exposure time, and automatic white balance. Then, the maximum R, G, and B signals ($R_{max}$, $G_{max}$, and $B_{max}$) of the acquired image signal are found. Then, the maximum signals ($R_{max}$, $G_{max}$, and $B_{max}$) are normalized to predetermined output values by adjusting exposure time. Herein, the predetermined output values are the maximum of values which can be output as an image signal. For example, if the predetermined output value is realized as a 12-bit digital value, the predetermined output value is 4095. In addition, the value 4095 corresponds to 100 IRE. When the predetermined maximum value is 4095, normalization for the R, G, and B signals is achieved through following Equation 4.

$$R' = \frac{4095}{R_{max}} \times R$$

$$G' = \frac{4095}{G_{max}} \times G$$

$$B' = \frac{4095}{B_{max}} \times B$$

Equation 4

R, G, and B signals having corrected black levels are normalized to predetermined values under the condition of employing the global gain and the exposure time as basic values as described above. The normalized R, G, and B signals have linear graphs.

If normalization has been achieved with respect to each of the R signal, the G signal, and the B signal, knee correction is achieved with respect to the normalized R, G, and B signals in predetermined knee points. This corresponds to an operation for changing a graph having a single gradient into a graph having various gradients on the basis of a knee point as described above. As described above, various gradients can be given according to intervals on the basis of knee points by adjusting the gain value of each of R, G, and B signals.

A gradient of each of the R signal, the G signal, and the B signal is defined as Equation 5.

$$m_R = \frac{R_{gain}}{0 \times 40} \times 2$$

$$m_G = \frac{G_{gain}}{0 \times 40} \times 2$$

$$m_B = \frac{B_{gain}}{0 \times 40} \times 2$$

Equation 5

If the gradient $m_G$ of the G signal is determined through Equation 5, the knee point for the G signal can be calculated by using the gradient $m_G$. After that, output data for the R signal and the B signal are calculated on the basis of the G signal in order to calibrate white balance. The output data for the R signal and the B signal are calculated according to Equation 6.

$$\alpha_R = \frac{m_R}{m_G}$$

$$\alpha_B = \frac{m_B}{m_G}$$

Equation 6

Figure 14:
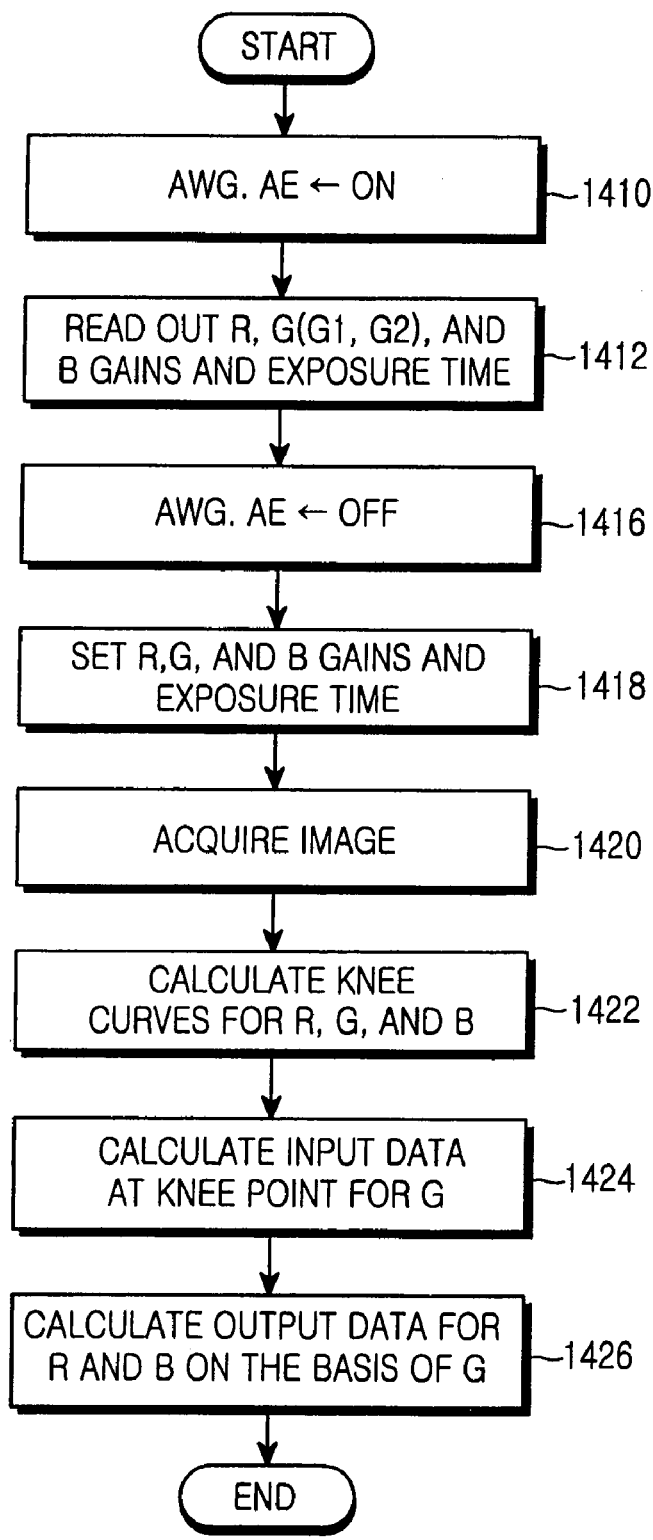
FIG. 14 is a flowchart showing a control procedure for performing knee correction according to an embodiment of the present invention.

FIG. 14 is a flowchart showing a control procedure for performing knee correction according to an exemplary embodiment of the present invention. FIG. 14 shows an example of a control procedure considering exposure time.

In step 1410, an automatic white balance function and an automatic exposure adjustment function are performed. This means use of both the automatic white balance function and the automatic exposure adjustment function generally employed in an image processing device. In step 1412, an R gain, a G gain, a B gain, and exposure time are read in a state in which the automatic white balance function and the automatic exposure adjustment function are performed. Herein, the G gain includes a G1 gain and a G2 gain.

After that, in step 1416, the automatic white balance function and the automatic exposure adjustment function are stopped. This means that both the automatic white balance function and the automatic exposure adjustment function generally-employed in an image processing device are not used. In step 1418, the R gain, the G gain, the B gain, and the exposure time are calibrated to predetermined values. The predetermined value for the R gain, the G gain, and the B gain may be 0×40 (default, gain 1), and the predetermined value for the exposure time may correspond to 50%. In step 1420, an image is acquired by means of the predetermined R, G, and B gains and the exposure time.

In step 1422, knee curves are obtained with respect to an R signal, a G signal, and a B signal of the acquired image on the basis of the G signal, respectively. The gradients of the knee curves are calculated according to above-suggested Equation 5. If the gradient calculation has been finished, step 1424 is performed so as to calculate input data (knee point) corresponding to a predetermined reference point (90 IRE) by using the gradient mG from among the calculated gradients in the G knee curve. In detail, an input data value corresponding to the knee point is calculated in the G knee curve. Then, in step 1426, in order to calibrate the white balance, an output data value corresponding to the input data value is calculated in consideration of the R gain and the B gain on the basis of the G gain. The output data value can be obtained through Equation 6 suggested above.

The above-mentioned knee correction relates to a scheme for using a knee curve. In the meantime, by way of another example for realizing knee correction, a look-up table may be used. Herein, the look-up table for mapping an input image signal within the range of allowable input data with a corresponding output data is previously created. Herein, since a relationship between the input image signal and the output image signal varies with exposure time, it is preferred that the loop-up table is created according to exposure time. Therefore, when knee correction is achieved, a loop-up table to be used is determined correspondingly to exposure time. The determination of a look-up table corresponds to the determination of a knee curve to be used. An output image signal mapped with an input image signal is obtained through the determined look-up table, thereby enabling the knee correction.

3. Gamma Correction

According to an exemplary embodiment of the present invention, image data are processed through gamma correction after interpolation. In detail, dead pixels from among pixels included in the image data are restored through the interpolation, and then, the restored image data are processed through the gamma correction, so that image data of superior image quality can be obtained. However, it is necessary to increase the size of a memory in order to perform the gamma correction with respect to the image data restored through the interpolation. However, a problem about space expanding due to the memory can be solved owing to development of a chip integration technology.

Generally, gamma correction using a digital operation is required in order to improve image quality. This reason is based on a characteristic of a display device (CTR, etc.,) in an image sensor. In order to cancel the distorted gamma signal in a screen, a gamma value inverse-symmetrical to an output of a distorted gamma signal must be input so that the linearity of the gamma signal may be restored. This is called the "gamma correction".

FIG. 11 is a graph for explaining the concept of the gamma correction. In FIG. 11, reference number 1120 shows the distorted gamma signal. Reference numeral 1100 shows a curve for gamma values for retrieving the linearity of the distorted gamma signal. Reference numeral 1110 shows a line for gamma values obtained by retrieving the linearity of the distorted gamma signal 1120 using the gamma values of the curve 1100.

Accordingly, in the image sensor, a final image signal output to the display device must have a characteristic of reference numeral 1100 in FIG. 11. In other words, the image sensor must perform the gamma correction with respect to an input image signal such that an image signal corresponding to the curve 1100 is output. Therefore, performance of the gamma correction depends on a how much a relationship between an input image signal and an output image signal is similar to the curve 1100.

To this end, according to an exemplary embodiment of the present invention, there is suggested a method for preceding interpolation for bad pixels, and then, performing gamma correction with respect to an image signal processed through the interpolation.

Hereinafter, the gamma correction according to an exemplary embodiment of the present invention will be compared with the conventional gamma correction. At this time, it is assumed that input luminance values are 4 and 12.

First, in the conventional scheme, a case of performing interpolation after gamma correction will be described.

An example of the conventional gamma correction is shown through Equation 7.

$$(4/255)^{2.2^{-1}} \times 255 = 27$$

$$(12/255)^{2.2^{-1}} \times 255 = 63 \quad \text{Equation 7}$$

As shown in Equation 7, if an input luminance value is 4, an output luminance value obtained through the gamma correction is 27, and if an input luminance value is 12, an output luminance value obtained through the gamma correction is 63.

Accordingly, if an input luminance value obtained through interpolation for both 27 and 63 is 8, an output luminance value is found through Equation 8.

$$(27+63)/2 = 45 \quad \text{Equation 8}$$

Accordingly, the finally obtainable output luminance value becomes 45 correspondingly to the input luminance value 8 through the conventional scheme.

Next, according to an exemplary embodiment of the present invention, a case of performing gamma correction after interpolation will be described.

Interpolation achieved with respect to input luminance values 4 and 12 can be represented as Equation 9.

$$(4+12)/2 = 8 \quad \text{Equation 9}$$

Gamma correction for the input luminance value 8 found through the interpolation is achieved through Equation 10.

$$(8/255)^{2.2^{-1}} \times 255 = 53 \quad \text{Equation 10}$$

As shown in Equation 10, when an input luminance value is 8, an output luminance value obtained through the gamma correction is 53.

Accordingly, when the output luminance value obtained through the conventional scheme is compared with the output luminance value according to an exemplary embodiment of the present invention with respect to the input luminance value 8, the output luminance value according to the exemplary embodiment of the present invention is improved by a luminance value of 6.2.

Hereinafter, according to an exemplary embodiment of the present invention, interpolation and gamma correction will be described with reference to the accompanying drawings.

Figure 12:
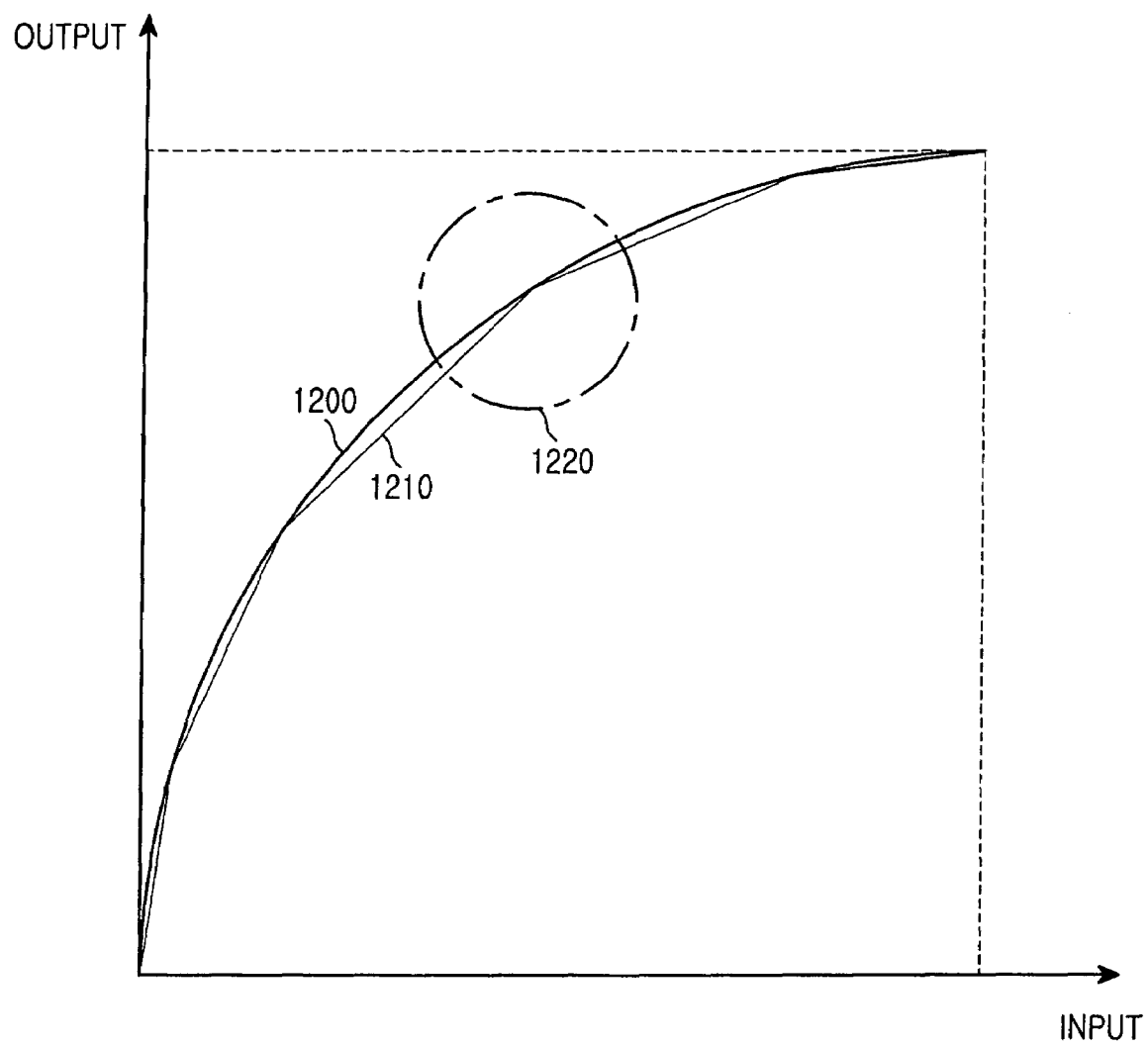
FIG. 12 is a graph showing a gamma curve of an image signal to be obtained through gamma correction according to an embodiment of the present invention.

FIG. 12 is a graph showing a gamma curve to be obtained according to an exemplary embodiment of the present invention. Reference numeral 1200 indicates an ideal gamma curve, and reference numeral 1210 indicates a real gamma curve according to the gamma correction. Herein, it can be understood that the gamma curves shown with the reference numerals 1200 and 1210 do not perfectly match with each other. This is because the real gamma curve cannot be obtained through output image signals corresponding to all input image signals. In other words, this is because the real gamma curve may be obtained by sampling an input image signal and then by using the input image signal processed through the sampling and an output image signal corresponding to the input image signal.

Figure 13:
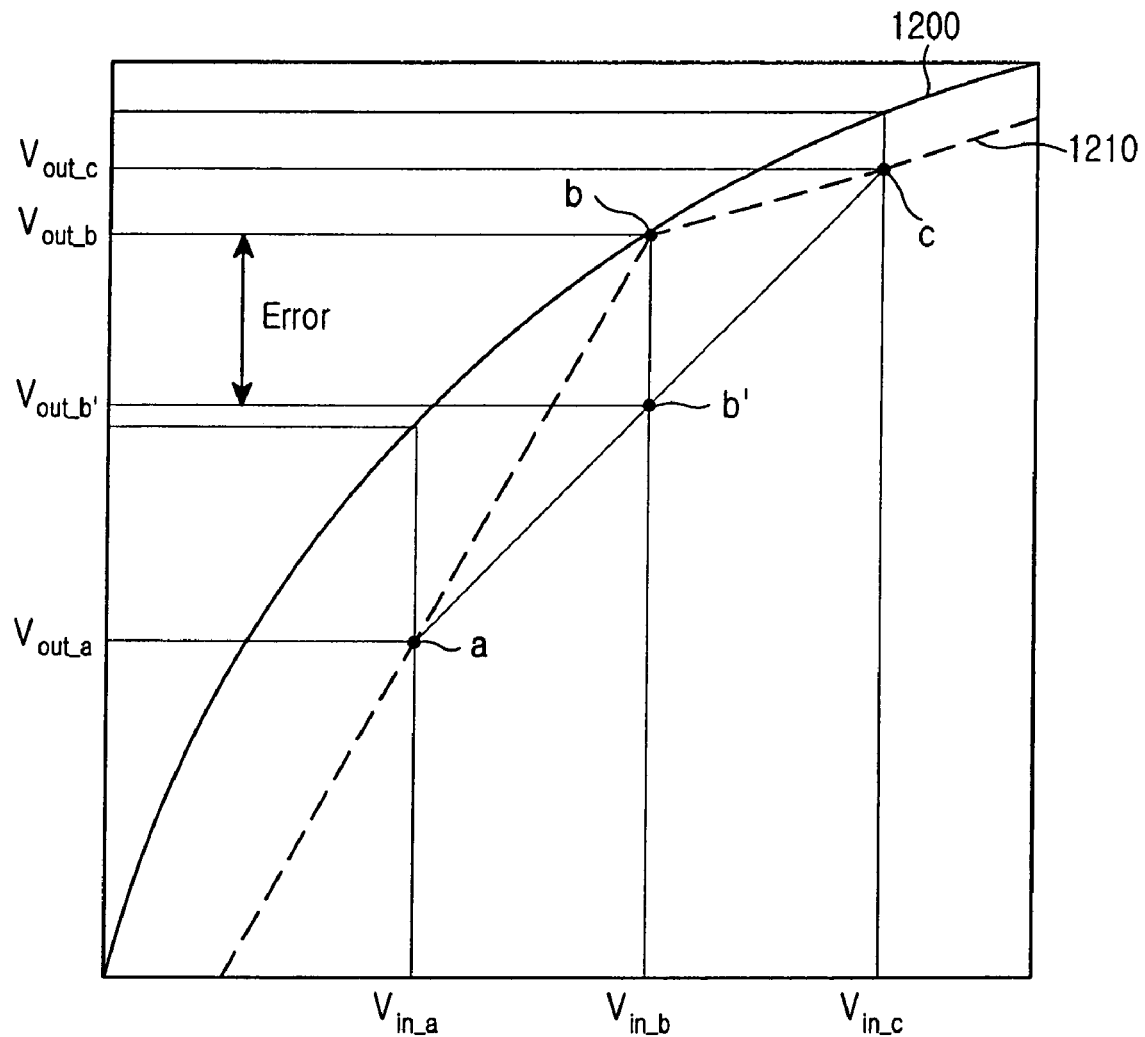
FIG. 13 is a graph showing an example of gamma correction according to an embodiment of the present invention.

FIG. 13 is a graph showing a gamma curve obtained by enlarging an area of reference numeral 1220 of FIG. 12. Through FIG. 13, difference between the real gamma curve and the ideal gamma curve is shown in more detail.

In FIG. 13, a pixel value ($V_{in\_b}$), which is the median value of pixel values ($V_{in\_a}$, $V_{in\_c}$) of two points, is interpolated through an interpolation procedure, and then, gamma correction is achieved with respect to the interpolated pixel value ($V_{in\_b}$).

Referring to FIG. 13, the interpolation and pixel correction part 212 interpolates the median pixel value ($V_{in\_b}$) by means of pixel values ($V_{in\_a}$, $V_{in\_c}$) of predetermined input two points. As described above, the interpolation for finding the median pixel value by using two pixel values is well known to those skilled in the art. For example, the median pixel value ($V_{in\_b}$) can be found through the average of the pixel values ($V_{in\_a}$, $V_{in\_c}$) of the two predetermined points.

After that, the pixel values ($V_{in\_a}$, $V_{in\_c}$) of the two predetermined points and the pixel values ($V_{in\_b}$) found through the interpolation are sent to the gamma correction part 216 after a color correction procedure. On the predetermined gamma curve, the gamma correction part 216 obtains an output ($V_{out\_a}$) mapped with a point a with respect to the pixel value ($V_{in\_a}$) and an output ($V_{out\_c}$) mapped with a point c with respect to the pixel value ($V_{in\_c}$). In the meantime, with respect to the pixel. ($V_{in\_b}$) found through the interpolation, an output ($V_{out\_b}$) mapped with a point b can be obtained. In other words, it can be understood that a value existing on the gamma curve 1210 is output correspondingly to an input value found through the interpolation.

However, when gamma correction is preceded as the conventional scheme, an error shown in FIG. 12 occurs with respect to an output value corresponding to the pixel value ($V_{in\_a}$). In other words, when the gamma correction is achieved with respect to the pixel values ($V_{in\_a}, V_{in\_c}$) of two predetermined points, the pixel values ($V_{out\_a}, V_{out\_c}$) are obtained as output values. After, interpolation is achieved by using the output values ($V_{out\_a}, V_{out\_c}$), thereby obtaining an output value ($V_{out\_b'}$) mapped with a point b with respect to the pixel value ($V_{in\_b}$). At this time, there occurs an error between the output value ($V_{out\_b'}$) and the output value ($V_{out\_b}$) mapped with the point b.

Accordingly, in the gamma correction using gamma curves, it can be noted that the gamma correction after interpolation is more ideal than the interpolation after gamma correction.

As described above, an exemplary embodiment of the present invention suggests black level correction, knee correction, and gamma correction in order to improve image quality. Accordingly, the following effects may be obtained.

First, a black level is measured by using a section, on which light is not incident, appearing due to a structure of an image sensor and the measured black level is reflected on an input image signal, thereby enabling realization of a desired black level image.

Second, a saturation area in which a ghost image appears is reduced through knee correction, thereby enabling realization of an image having relatively improved image quality.

Third, gamma correction is achieved with respect to an image signal processed through interpolation in order to reduce an error caused by the conventional gamma correction, thereby enabling realization of an image having improved image quality.

While the invention has been shown and described with reference to certain exemplary embodiments thereof, it will be understood by those skilled in the art that various changes in form and details may be made therein without departing from the spirit and scope of the invention. Consequently, the scope of the invention should not be limited to the exemplary embodiments, but is defined by the appended claims and equivalents thereof.

What is claimed is:

1. An image processing method for improving image quality in a digital camera which photographs a target object by using a predetermined exposure time, converts an optical signal applied through photographing into an image signal, and outputs the image signal, the image processing method comprising the steps of:

measuring a black level value caused by dark current and calibrating a black level of the image signal by using the measured black level value;

dividing input luminance of the image signal into predetermined sections and providing different gain values to the sections, thereby performing knee correction with respect to the image signal by using the gain value provided to a section including luminance of the image signal having the calibrated black level of the sections;

receiving the image signal processed through the knee correction and restoring a dead pixel included in the image signal through interpolation;

performing gamma correction with respect to the image signal in which the dead pixel is restored;

separating a luminance component from a chromaticity component in the image signal processed through the gamma correction and outputting the luminance component and the chromaticity component;

receiving the luminance component and outputting exposure time required for the black level calibration and the knee correction; and receiving the chromaticity component and outputting a gain value for the knee correction, wherein the sections are input luminance ranges distinguished by knee points when at least one predetermined reference luminance is employed as a knee point, and have relatively small gain values as the sections approximates to a white saturation time point.

2. The image processing method as claimed in claim 1, wherein white correction is achieved with respect to the image signal by using the gain value.

3. The image processing method as claimed in claim 1, wherein the black level value is measured by using an image signal provided from at least one pixel on which light is not incident at photographing of the target object.

4. The image processing method as claimed in claim 1, wherein, when an output maximum luminance level of the image signal is 255, the black level calibration is achieved through Equation, $$OutImg[y][x] = \frac{InImg[y][x] - \text{Low}}{255 - \text{Low}} \times 255,$$

where the 'InImg[y][x]' denotes an input luminance value of the image signal, the 'OutImg[y][x]' denotes an output luminance value of the image signal, and the 'Low' denotes a measured black level value.

5. The image processing method as claimed in claim I, further comprising a step of performing color correction for correcting the image signal having the restored dead pixel into a standard image signal before the gamma correction.

6. The image processing method as claimed in claim 1, wherein the black level calibration and the knee correction are achieved with respect to an analog image signal.

7. An image processing apparatus for improving image quality in a digital camera which photographs a target object by using predetermined exposure time, converts an optical signal applied through the photographing into an image signal, and outputs the image signal, the image processing apparatus comprising:

an image signal calibration part for calibrating a black level of the image signal by using a black level value caused by dark current and providing different gain values to sections distinguishing input luminance of the image signal, thereby performing knee correction with respect to the image signal by using a gain value provided to a section comprising luminance of the image signal having the calibrated black level of the sections;

an interpolation and pixel correction part for receiving the image signal processed through the knee correction and restoring a dead pixel included in the image signal through interpolation;

a gamma correction part for performing gamma correction with respect to the image signal in which the dead pixel is restored;

a color space transformation part for separating a luminance component from a chromaticity component in the image signal processed through the gamma correction and outputting the luminance component and the chromaticity component;

an exposure adjustment part for receiving the luminance component and outputting exposure time required for the black level calibration and the knee correction; and a white balance calibration part for receiving the chromaticity component and outputting a gain value for the knee correction, wherein the sections are input luminance ranges distinguished by knee points when at least one predetermined reference luminance is employed as a knee point, and have relatively small gain values as the sections approximates to a white saturation time point.

8. The image processing apparatus as claimed in claim 7, wherein the black level value is measured by using an image signal including at least one pixel on which light is not incident at photographing of the target object.

9. The image processing apparatus as claimed in claim 8, wherein white correction is achieved with respect to the image signal by using the gain value.

10. The image processing apparatus as claimed in claim 9, wherein the image signal calibration part includes:

an analog/digital converter for converting an analog signal into a digital signal;

a black level calibration part for calibrating a black level of the digital image signal by using the measured black level value; and a knee/white calibration part for confirming a section, which includes luminance of an image signal having the calibrated black level, from among the sections and amplifying the image signal by using a gain value provided to the confirmed section.

11. The image processing apparatus as claimed in claim 9, wherein the image signal calibration part includes:

a black level calibration part for calibrating a black level of the image signal by using the measured black level value;

a knee/white calibration part for confirming a section, which includes luminance of an image signal having the calibrated black level, from among the sections and amplifying the image signal by using a gain value provided to the confirmed section; and an analog/digital converter for converting an analog image signal processed through the knee/white calibration into a digital image signal.

12. The image processing apparatus as claimed in claim 9, wherein the image signal calibration part includes a black level calibration part for calibrating a black level of the image signal by using the measured black level value;

a knee/white calibration part for confirming a section, which includes luminance of an image signal having the calibrated black level, from among the sections and amplifying the image signal by using a gain value provided to the confirmed section;

an analog/digital converter for converting an analog image signal processed through the knee/white calibration into a digital image signal; and a white calibration part for performing white calibration with respect to the digital image signal by using the gain value.

13. The image processing apparatus as claimed in claim 7, wherein, when an output maximum luminance level of the image signal is 255, the black level calibration is achieved through Equation, $$OutImg[y][x] = \frac{InImg[y][x] - \text{Low}}{255 - \text{Low}} \times 255,$$

where the 'InImg[y][x]' denotes an input luminance value of the image signal, the 'OutImg[y][x]' denotes an output luminance value of the image signal, and the 'Low' denotes a measured black level value.

14. The image processing apparatus as claimed in claim 7, further comprising a color correction part for correcting the image signal having the restored dead pixel into a standard image signal between the interpolation and the pixel correction part and the gamma correction part.

* * * * *

UNITED STATES PATENT AND TRADEMARK OFFICE
CERTIFICATE OF CORRECTION

| | |
|---|---|
| PATENT NO. | : 7,639,292 B2 |
| APPLICATION NO. | : 11/159223 |
| DATED | : December 29, 2009 |
| INVENTOR(S) | : Kwon et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Ninth Day of November, 2010

David J. Kappos
*Director of the United States Patent and Trademark Office*